L. L. TATUM.
REGULATION OF DYNAMO ELECTRIC MACHINES.
APPLICATION FILED FEB. 11, 1910.
1,134,244.
Patented Apr. 6, 1915.
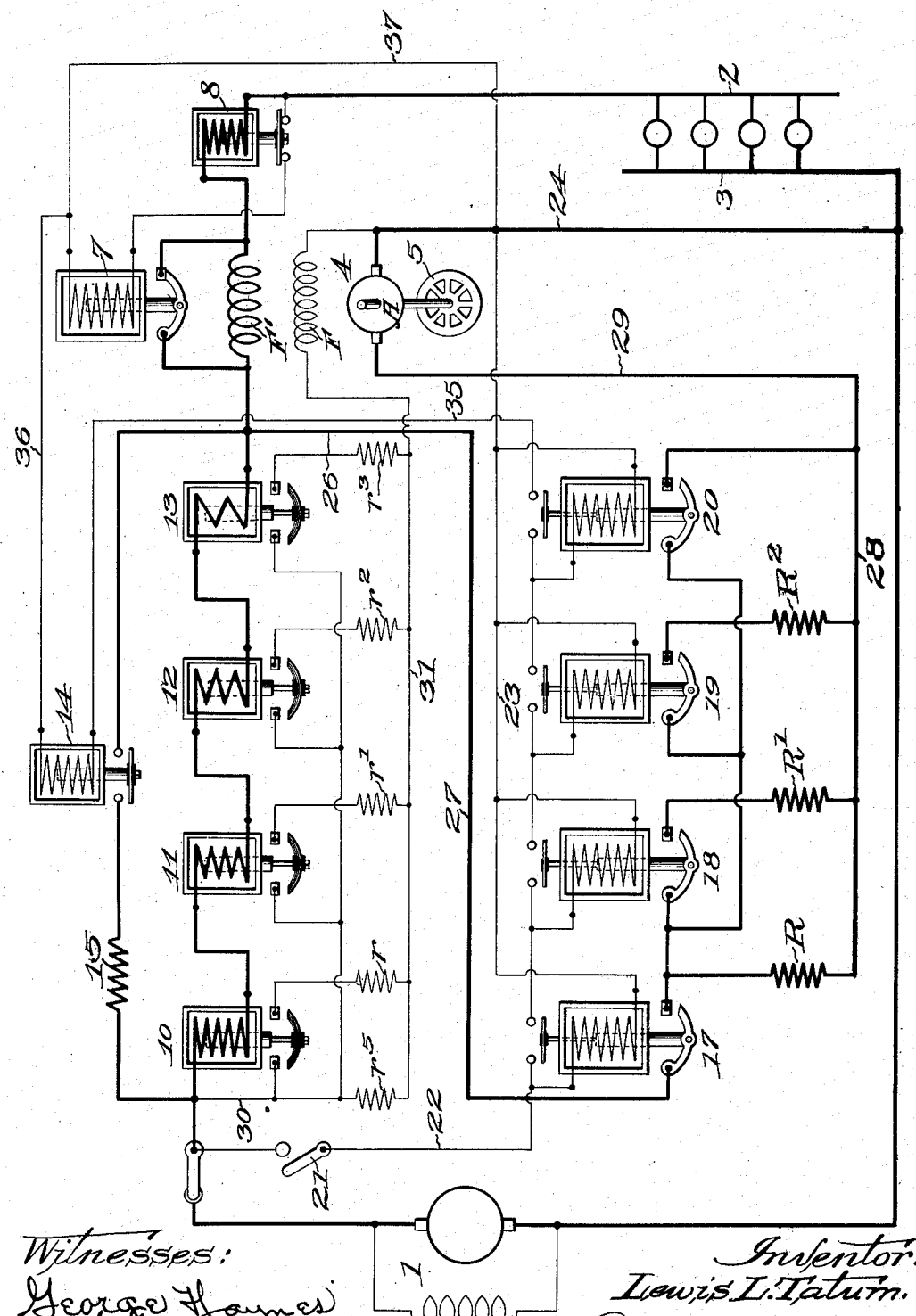

UNITED STATES PATENT OFFICE.

LEWIS L. TATUM, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATION OF DYNAMO-ELECTRIC MACHINES.

1,134,244. Specification of Letters Patent. Patented Apr. 6, 1915.

Application filed February 11, 1910. Serial No. 543,295.

*To all whom it may concern:*

Be it known that I, LEWIS L. TATUM, a citizen of the United States, residing at Milwaukee, in the county of Milwaukee and State of Wisconsin, have invented new and useful Improvements in Regulation of Dynamo-Electric Machines, of which the following is a full, clear, concise, and exact description, reference being had to the accompanying drawing, forming a part of this specification.

My invention relates to improvements in the regulation of dynamo electric machines.

My invention has for one of its objects to provide, in conjunction with a suitable source of electrical energy, a dynamo electric machine arranged to normally operate as a motor upon power supplied from said source and to provide automatic means adapted, under certain conditions, to cause said dynamo electric machine to augment the supply of power from said source.

A further object of my invention is to provide means whereby the dynamo electric machine will be automatically caused to deliver power whenever the demand upon the main source of supply exceeds a predetermined limit.

A still further object of my invention is to provide means whereby the power delivered by said dynamo electric machine will be proportional to the increased demand.

My invention also has various other objects and advantages which will be hereinafter set forth.

For the purpose of more clearly disclosing the nature and characteristic features of my invention, I shall describe the embodiment thereof diagrammatically illustrated in the accompanying drawing. It should, of course, be understood that my invention is not limited to the particular embodiment thereof illustrated, but is capable of various modifications.

In the arrangement illustrated, I have shown a main generator 1 for supplying current to a suitable translating or load circuit 2—3 and a dynamo electric machine 4 adapted, under the conditions hereinafter set forth, to coöperate with the generator in supplying current to said translating circuit. The main generator may be of any preferred type. For the auxiliary machine 4, I may simply employ a direct current motor. In practice, I prefer to employ a shunt wound motor, provided with an auxiliary field winding and have, therefore, illustrated the same as provided with an armature A, a shunt field winding F and an auxiliary field winding F'. The function of the machine 4 is two-fold. When the current demanded in the translating circuit is below a predetermined maximum, I propose to have the machine 4 operate as a motor to store up energy in a suitable fly wheel 5 fixed to its armature shaft; and, when the current demanded exceeds the predetermined maximum, to cause said machine to operate as a generator driven by the fly wheel 5. The machine 4 is connected in parallel with the generator and is supplied with current therefrom to cause it to operate as a motor. Consequently, the machine 4 will only act as a generator to deliver power when its C. E. M. F. exceeds the voltage impressed thereon by the generator. The machine 4 necessarily has an appreciable internal resistance and, therefore, in order to cause the same to promptly deliver power when the demand on the generator rises above the predetermined maximum, it is necessary to increase its field strength. This may be accomplished by increasing the strength of the shunt field winding F; but, owing to the high inductance of a shunt field winding, the same is more or less sluggish in responding to slight changes in the excitation thereof. It is for this reason that I prefer to provide the auxiliary field winding F', which being of lower inductance, will respond more readily to build up the field excitation of the machine. This auxiliary field winding I prefer to connect in the translating or load circuit so as to subject the same to variations in the current demanded by the load. With such an arrangement, it will be seen that as the current demanded by the load increases, the strength of said field winding will increase, thereby causing the power delivered by the machine 4 to increase proportionately. As before stated, it is only desired to have the machine 4 supply power when the power demanded by the load exceeds a predetermined maximum. While the power demanded by the load is below the predetermined maximum, it is desirable to accelerate the machine 4 to a high degree in order to store up a maximum amount of energy in the fly wheel 5. This high degree of acceleration of the machine 4 can only be obtained with a low field excitation, and I, therefore, preferably weaken the auxiliary field winding F' while the power demanded by the load is below the predetermined maximum. For accomplishing this, I have provided an electroresponsive switch 7 adapted, when closed, to complete a short-circuit around the auxiliary field winding F'. I have also provided a relay switch 8 having its operating winding connected in the translating or load circuit. The function of this switch is to respond at a predetermined current value to deënergize the switch 7, thereby opening the shortcircuit around the auxiliary field winding F'.

Although the shunt field winding is more or less sluggish in its response to changes in the excitation thereof, I prefer to provide means for increasing its strength. The means illustrated comprises a plurality of electroresponsive relay switches 10, 11, 12 and 13, arranged to insert parallel resistances $r$, $r'$, $r^2$ and $r^3$ in the circuit of the shunt field winding. A resistance $r^5$ is permanently connected in the circuit of the shunt field winding to normally weaken the same. Consequently, successive insertion of the parallel resistances $r$ to $r^3$ will gradually increase the flow of current to the shunt field winding, thereby increasing the strength thereof. The function of the relay switches is two-fold. It is my desire to have one or more of these switches respond, as soon as the power demanded reaches the predetermined maximum, to increase the shunt field strength of the machine 4 to assist the auxiliary field winding in causing the machine to act as a generator. I also desire to have the remaining relay switches operate to gradually increase the strength of the shunt field winding still further as the machine 4 slows down due to the expenditure of the energy stored in the fly wheel 5. To secure the desired operation of the relay switches, I connect the operating windings thereof in series with the generator 1 and adjust said switches to respond at different current values. With this arrangement, as the machine 4, when operating as a generator, slows down, the current delivered thereby decreases with the result that more current is drawn from the generator 1. This, of course, causes a greater flow of current through the operating windings of the relay switches with the result that the same will respond successively as the current deliverd by the machine 4 falls off, and the current delivered by the generator 1 increases.

For a purpose hereinafter set forth, I prefer to subject the relay switches to the full flow of current from the generator upon initially starting the machine 4 as a motor, but to decrease the flow of current through the operating windings of said switches when the machine 4 has been accelerated. For accomplishing this reduction of current, I have provided an electroresponsive switch 14 arranged to close a shunt circuit, including a properly designed resistance 15 around the operating windings of said switches. Furthermore, by establishing this shunt circuit, I am enabled to employ smaller relay switches.

For connecting the machine 4 in circuit and accelerating the same, I have provided a plurality of electroresponsive switches 17, 18, 19 and 20, said switches having auxiliary contacts for causing successive operation thereof. In practice, any preferred means may be employed for connecting the machine 4 in circuit and accelerating the same. I prefer, however, to employ parallel resistances R, R' and R² for accelerating the motor. These resistances are successively inserted in circuit by the switches 17, 18 and 19, while the switch 20 connects the machine 4 directly across the generator circuit. For initially controlling the circuit of the operating winding of switch 17, I have shown a manually operated switch 21.

I shall now describe the operation of the apparatus illustrated, assuming that the generator is operating with no load. Upon closure of switch 21, circuit is closed from one terminal of the generator through said switch by conductor 22, through the operating winding of switch 17, by conductors 23 and 24 to the lead from the opposite terminal of the generator. The switch 17 thereupon responds, completing a circuit from one terminal of the generator 1, through the operating windings of the relay switches, by conductors 26 and 27, through said switch 17 and resistance R, by conductors 28 and 29, through the armature of machine 4, to conductor 24 and thence to the opposite terminal of the generator 1. The shunt field winding of the machine 4 is permanently connected across the generator circuit. Its circuit may be traced from one lead of the generator, by conductor 30, through the resistance $r^5$, by conductor 31, through said winding, to conductor 24. Consequently, upon closure of switch 17, the motor will start, but with the protective resistance R in circuit with its armature and with a weakened field. However, upon closure of switch 17, a heavy surge of current is sent through the operating windings of the relay switches 10 to 13, and, consequently, some of said switches will respond according to their adjustment. This results in inserting the resistances $r$ to $r^3$ in parallel with the resistance $r^5$, thereby increasing the flow of current through the shunt field winding. This, of course, increases the field excitation of the machine 4, thereby increasing the torque of said machine. This is desirous for the reason that considerable torque is required in order to initially start the fly wheel 5, owing to the inertia thereof. Closure of the switch 17 through its auxiliary contact completes the circuit through the operating winding of the switch 18. The switch 18 thereupon responds, inserting the resistance R' in parallel with the resistance R. This, of course, increases the flow of current through the motor armature, causing the same to build up in speed. Likewise, closure of the switch 18 through its auxiliary contact closes the circuit through the operating winding of the switch 19. The switch 19 thereupon closes, inserting the resistance $R^2$ in parallel with the resistances R and R', causing the motor to still further build up in speed. In a similar manner switch 19 causes the switch 20 to respond, thereby connecting the armature of the machine 4 directly across the generator circuit. Switch 20, through its auxiliary contact, completes a circuit by conductor 35, through the operating winding of switch 14, by conductors 36 and 37 to conductor 24. This results in connecting the operating winding of switch 14 in parallel with the operating winding of switch 20. Switch 14, therefore, responds, closing the shunt circuit around the operating windings of the relay switches. This, of course, reduces the flow of current through the operating windings of the relay switches, the resistance 15 being so designed as to cause a sufficient reduction in current to deënergize all of the switches that have responded. Deënergization of the relay switches reduces the flow of current through the shunt field winding of the machine 4, thereby decreasing the field excitation of the machine. The machine 4 now receiving full armature current and having a weakened field, will accelerate to a high degree, thereby storing up a maximum amount of energy in the fly wheel 5. Suitable means, such as current limiting relays, may be used to prevent the closure of switches 17, 18, 19, 20 and 14 more rapidly than required for proper acceleration of the fly wheel, but these have been omitted in the diagram for the sake of clearness, since they are not an essential element of this invention. Similarly, the current relays 10, 11, 12, and 13 being adjusted to open at different currents, automatically act to insert field weakening resistance only when the accelerating current has fallen enough to permit further weakening of the field without an excessive surge of motor current.

Assuming, now, that suitable translating devices are connected in the circuit 2—3, said translating devices will be supplied with current from the generator alone so long as the power required thereby remains within predetermined limits. During this time, the machine 4 will continue to operate as a motor, consuming but little of the power supplied by the generator. If, now, the load upon the generator be increased above the predetermined maximum,—as, for instance, by connecting more translating devices in circuit,—the relay device 8 will respond, thereby deënergizing the switch 7. This opens the short-circuit around the auxiliary field winding F'. The auxiliary field winding will then receive the entire current passing through the translating devices and thereupon quickly build up the field strength of the machine 4. Also one or more of the relay switches may respond according to the magnitude of excess power demanded. This, as previously set forth, results in increasing the strength of the shunt field winding of the machine 4. This building up of the field strength of the machine 4 causes said machine to operate under the impetus of the fly wheel 5 to supply current to the translating circuit. The machine 4 may be so designed as to practically relieve the generator 1 of its entire excessive load. Of course, the machine 4 will gradually slow down as the energy stored in the fly wheel is spent. This, as previously set forth, causes a reduction in the power supplied by the machine 4, thereby increasing the power demand on the generator 1. This causes successive operation of the remaining relay switches, thereby gradually increasing the shunt field strength of the machine 4 as the speed of said machine decreases. This tends to maintain the voltage of machine 4 above the voltage impressed upon it by generator 1, as long as the excessive load is maintained or until the speed of the fly wheel has decreased, until even under full field strength the voltage of machine 4 can no longer be maintained above the impressed voltage, at which time it will again float as an idle motor, ready to reaccelerate when the current through the translating devices falls sufficiently to allow relays 10, 11, 12 and 13 to open, thus weakening the field of machine 4 and causing it to again speed up the fly wheel.

In practice, the size and speed of the fly wheel, and the determination of the desired maximum load, should be so chosen that the duration of loads above that maximum should never be sufficient to exhaust the available energy of the fly wheel, as it will be apparent that the sensitiveness of the response to increased loads in the translating devices is a maximum when machine 4 is at maximum speed with weak field, and becomes less and less sensitive as the speed decreases and the field strength increases.

Having thus described my invention, what I desire to secure by Letters Patent is:—

1. In combination, a source of electrical supply, a load circuit connected thereto, a dynamo-electric machine connected to said source to normally operate as a motor and having energy storing means associated therewith, and means for increasing the excitation of said machine upon an increase in the power demanded by said load circuit and to a degree proportional to the increased demand whereby said machine is caused to act as a generator and other means automatically increasing the excitation of said machine as the speed decreases.

2. In combination, a source of electrical supply, a load circuit connected thereto, a dynamo-electric machine connected to said source to normally operate as a motor and having energy storing means associated therewith, means for exciting said machine under certain conditions by the load current to cause said machine to act as a generator, and means for independently increasing the excitation of said machine as the speed thereof decreases.

3. In combination, a source of electrical supply, a load circuit connected thereto, a dynamo-electric machine connected to said source to normally operate as a motor and having energy storing means associated therewith and means for additionally exciting said machine by the load current but only under abnormal load conditions to cause the same to act as a generator.

4. In combination, a source of electrical supply, a load circuit connected thereto, a dynamo-electric machine connected to said source to normally operate as a motor and having energy storing means associated therewith, said machine having an exciting winding connected between the same and said load circuit to cause said machine to act as a generator under certain load conditions, and means independent of said winding for increasing the excitation of said machine as the speed decreases.

5. In combination, a source of electrical supply, a load circuit connected thereto, a fly-wheel dynamo-electric machine connected to said source to normally operate as a motor, said machine having an exciting winding connected between the same and said load circuit to cause said machine to act as a generator under certain load conditions, and means responsive to the current from said source to increase the excitation of said machine independently of said winding as the speed of said machine decreases.

6. In combination, a source of electrical supply, a translating circuit connected thereto, a dynamo-electric machine connected to said source to normally operate as a motor and having energy storing means associated therewith, said machine having a normally inert exciting winding and means for subjecting said winding to energization by the current of said translating circuit under certain load conditions to cause said machine to act as a generator.

7. In combination, a source of electrical supply, a translating circuit connected thereto, a dynamo-electric machine connected to said source to normally operate as a motor and having energy storing means associated therewith, said machine having a normally inert exciting winding, and means for subjecting said winding to energization by the current of said translating circuit under certain load conditions to cause said machine to act as a generator, said means including an electro-responsive device having its operating winding connected in said translating circuit.

8. In combination, a source of electrical supply, a translating circuit connected thereto, a dynamo-electric machine connected to said source to normally operate as a motor and having energy storing means associated therewith, said machine having a shunt field winding and an auxiliary field winding, the latter connected between said source and said translating circuit, and means normally rendering said auxiliary winding inert and automatically rendering the same effective to cause said machine to act as a generator when the power demanded from said source exceeds a certain limit.

9. In combination, a source of electrical supply, a translating circuit connected thereto, a dynamo-electric machine connected to said source to normally operate as a motor and having energy storing means associated therewith, said machine having a shunt field winding and an auxiliary field winding, the latter connected between said source and said translating circuit, and means normally rendering said auxiliary winding inert and automatically rendering the same effective to cause said machine to act as a generator when the power demanded from said source exceeds a certain limit, said means including an electro-responsive switch normally energized to short-circuit said auxiliary winding and an electro-responsive relay responsive to the translating current to deenergize said switch.

10. In combination, a source of supply, a load circuit connected thereto, a fly-wheel dynamo-electric machine having two exciting windings, said machine normally operating as a motor with one of said windings inert, means for energizing said inert winding to cause said machine to act as a generator when the current in said translating circuit rises to a predetermined value, and means for increasing the excitation of the other of said windings as the speed of said machine decreases.

11. In combination, a source of supply, a load circuit connected thereto, a fly-wheel dynamo-electric machine having two exciting windings, said machine normally operating as a motor with one of said windings inert, means for energizing said inert winding to cause the said machine to act as a generator when the current in said translating circuit rises to a predetermined value and means for increasing the excitation of the other of said windings as the speed of said machine decreases, said last-mentioned means including a plurality of relays responsive at different current values and having their windings connected between said machine and said source.

12. The combination with a source of supply, of a load circuit connected thereto, a flywheel dynamo-electric machine connected across said supply circuit and provided with a shunt field winding and an auxiliary field winding, said latter winding being connected in series with said source between said load circuit and said dynamo-electric machine, means normally short-circuiting said auxiliary field winding and operating to remove said short-circuit when the current of said load circuit exceeds a predetermined value, a plurality of relays responsive at different current values and having their windings connected in series between said source and said machine, and resistances for the circuit of said shunt field winding controlled by said relays.

13. In combination, a source of electrical supply, a fly wheel dynamo electric machine normally operating as a motor upon power supplied from said source, a load circuit, electro responsive means connected in the load circuit for directly increasing the field excitation of said machine under heavy load conditions to cause said machine to act as a generator to supplement the power of said source to a degree corresponding to the load variation and electro-responsive means connected between said dynamo electric machine and said source to respond to variations in the current delivered from said source to gradually increase the field excitation of said machine as its speed falls off.

14. In combination, a source of electrical supply, a dynamo electric machine having a shunt field winding, a fly wheel operatively connected to said machine, said machine being arranged to normally operate as a motor to store up energy in said fly wheel, a plurality of resistances, controlling switches for said resistances having operating windings connected in series between said source of supply and said machine, said switches being adapted to respond at different current values to increase the excitation of said field winding whenever the electrical load upon said source increases above a predetermined limit, thereby causing said machine to act as a generator and to further increase the excitation of said winding as the speed of said machine decreases.

15. In combination, a source of electrical supply, a translating circuit, a fly wheel dynamo electric machine having a shunt field winding and an auxiliary winding, the latter being connected in series between the translating circuit and said machine, current relays controlling the shunt field strength of said machine, said relays having their operating windings connected in series between said source of supply and said machine, and means for automatically including and excluding said auxiliary field winding from circuit, said machine normally operating as a shunt motor for driving said fly wheel and upon a predetermined increase in load on the translating circuit, operating as a compound generator and continuing to so operate as a compound generator as long as the load on the translating circuit exceeds a predetermined value or until the speed of its fly wheel has decreased to a predetermined value.

16. In combination, a source of supply, a fly-wheel dynamo-electric machine normally operating as a motor on power from said source, means responding to variations in the power demanded from said source to vary the field strength of said machine and means for initially starting said machine and controlling said former means to provide said machine with a strong field for starting.

17. In combination, a source of electrical supply, a fly-wheel dynamo-electric machine normally operating as a motor on power from said source, means normally weakening the field of said machine and responsive to strengthen the same for generator action of said machine, and means for subjecting said former means to different percentages of the total current from said source, for starting said machine and for subsequent regulation thereof.

In witness whereof, I have hereunto subscribed my name in the presence of two witnesses.

LEWIS L. TATUM.

Witnesses:
FRANK H. HUBBARD,
E. W. WUSSON.